United States Patent [19]
Colarelli, III et al.

[11] Patent Number: 5,386,639
[45] Date of Patent: Feb. 7, 1995

[54] MULTI-AXLE VEHICLE SIDESLIP TESTER

[75] Inventors: Nicholas J. Colarelli, III, Creve Coeur; Paul G. Marting, Chesterfield, both of Mo.

[73] Assignee: Hunter Engineering Company, Bridgeton, Mo.

[21] Appl. No.: 52,114

[22] Filed: Apr. 23, 1993

[51] Int. Cl.⁶ .......................... G01B 7/24; G01B 7/30
[52] U.S. Cl. .............. 33/203.14; 33/203.12; 33/193
[58] Field of Search ........... 33/203.12, 203.14, 203.15, 33/203.17, 203.21, 288, 193

[56] References Cited

U.S. PATENT DOCUMENTS

| | | |
|---|---|---|
| 1,487,759 | 3/1924 | Skinner . |
| 1,665,161 | 4/1928 | Frazier . |
| 1,883,180 | 10/1932 | Weaver . |
| 1,890,218 | 12/1932 | Duby . |
| 1,950,994 | 3/1934 | Musselman . |
| 3,137,076 | 6/1964 | Hurst ........................ 33/203.12 |
| 3,905,120 | 9/1975 | Butler . |
| 4,445,278 | 5/1984 | Staudinger ............. 33/203.14 X |
| 5,129,149 | 7/1992 | Colarelli et al. . |

FOREIGN PATENT DOCUMENTS 55-96435  7/1980  Japan .

Primary Examiner—Alvin Wirthlin
Attorney, Agent, or Firm—Polster, Lieder, Woodruff & Lucchesi

[57] ABSTRACT

A sideslip tester detects sideslip and scrub in a vehicle having a steering axle and one or more pairs of tandem axles. The sideslip tester has a runway having a measurement plate which is moved laterally with respect to its longitudinal axis as a tire of the vehicle passes over the measurement plate as a result of lateral forces acting upon the tire. A lateral movement sensor operatively connected to the measurement plate determines the amount of lateral movement of the measurement plate as the vehicle tire passes over the plate and provides an output corresponding to the amount of lateral movement measured. The sideslip tester can determine when it is presented with tandem axles. When it is presented with tandem axles, the sideslip tester will determine the scrub angle of the tandem axles to determine if they are parallel.

26 Claims, 5 Drawing Sheets

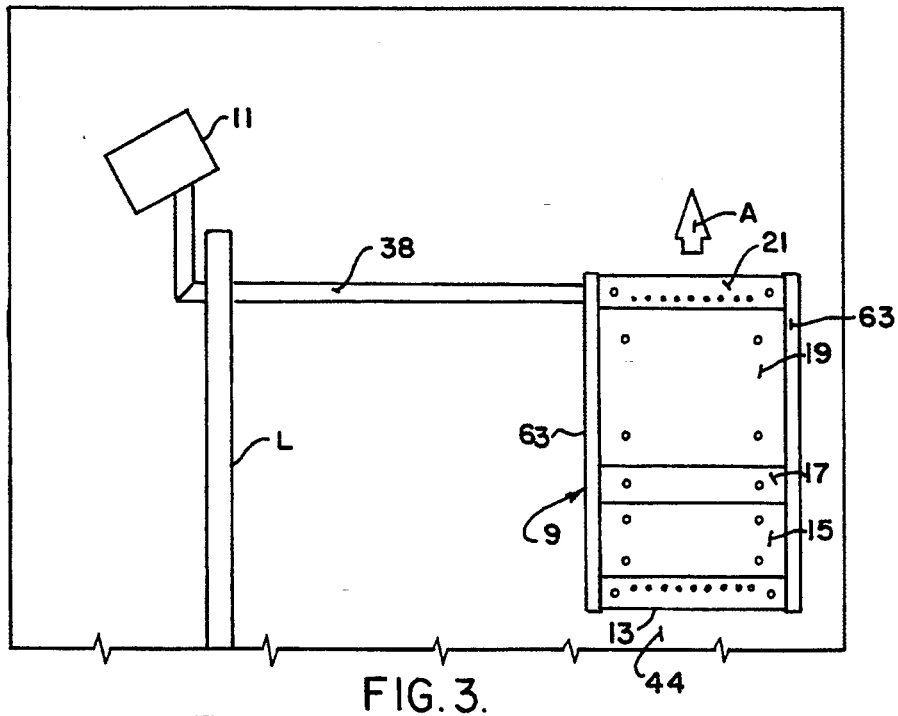
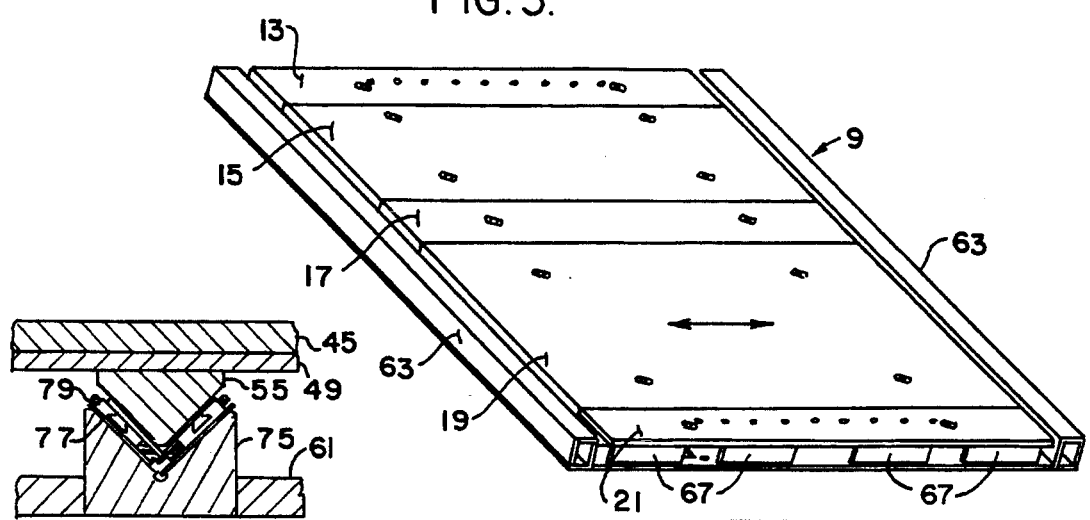
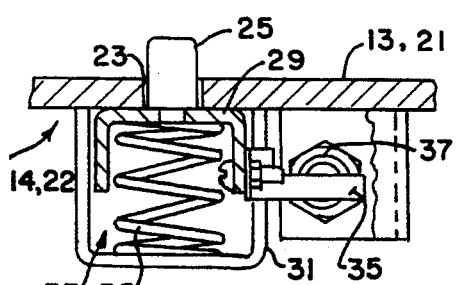
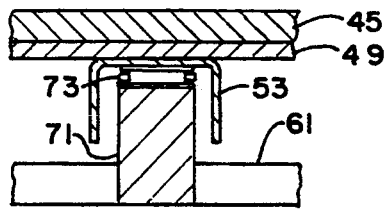

DISPLAY AND CONTROL

MULTI-AXLE VEHICLE SIDESLIP TESTER

BACKGROUND OF THE INVENTION

This invention relates to sideslip testers for vehicles, and, in particular, to sideslip testers for multi-axle vehicles which can measure the scrub angle of the vehicles' tandem axles.

As a vehicle rolls down the road, there should not be any lateral forces on the tires. When lateral forces are present, the net effect of these forces is the same as if the wheels were being dragged sideways as they roll down the road. These lateral forces will scuff the tires, causing them to wear prematurely.

Sideslip is a measure of the magnitude of these lateral forces and is measured in units of feet/mile or meters/kilometer. For example, a sideslip measurement of twenty feet/mile means that if that vehicle were driven in a straight line for one mile, the tires would have been scuffed sideways a distance of twenty feet.

The largest influence on the sideslip measurement is total toe. A positive sideslip measurement generally reflects a toe-in condition and a negative sideslip measurement generally reflects a toe-out condition. A sideslip tester can thus be used as a diagnostic tool to determine if a particular vehicle has alignment problems which should be checked further.

Sideslip meters are known, and in our U.S. Pat. No. 5,129,149, which is incorporated herein by reference, we described a sideslip meter which may be used with automobiles. The sideslip meter disclosed therein measured the sideslip of the wheels on the front and back axles of the car independently of each other. Although that meter could be used for multi-axle vehicles to measure the sideslip of the tires of each set of wheels independently, multi-axle vehicles, having pairs of tandem axles, have particular problems which that meter does not address.

In multi-axle vehicles with tandem axles, the sideslip of a particular axle is not due solely to the toe condition of the wheels of that axle. Rather, it is affected by the geometric relationship of the tandem axles. The tandem axles should be parallel to each other. If not, a scrub angle exists, which, like sideslip, is measured in feet/mile or meters/kilometer. Because the wheels of the tandem axle are close together (averaging only 52 inches from center to center), if a scrub angle exists, the forward motion of the wheels of one of the axles of the tandem axle pair will create a sideslip in the tires of the other axles. Further, the steering axle must be operated to overcome the lateral forces exerted thereon as a result of the existence of the scrub angle in the tandem axles. This creates a sideslip on the steering axle that is not due solely to the toe condition of the wheels of the steering axle.

The presence of a scrub angle in the tandem axle pair thus affects the sideslip for all the wheels of multi-axle vehicles. Therefore, to accurately determine sideslip on a multi-axle vehicle, the sideslip tester or meter must be able to determine the scrub angle of tandem axles. To do this, the sideslip meter must be able to recognize that the tires of tandem axles are rolling over it. Currently available sideslip testers or meters, however, are not believed to be able to compute sideslip measurements for more than two axles, nor are they believed to be able to determine scrub angles for tandem axles.

SUMMARY OF THE INVENTION

Among the various objects and features of the present invention may be noted the provision of a sideslip tester which accurately and reliably measures sideslip.

A second object is the provision of such a sideslip tester which can measure the sideslip for more than two axles.

A third object is the provision of such a sideslip tester which can determine when it is being presented with tandem axles.

A fourth object is the provision of such a sideslip tester which can determine the scrub angle of the tandem axles.

Other objects and features will become apparent to those skilled in the art in light of the following disclosure and accompanying drawings.

Briefly stated, the sideslip tester of the present invention detects sideslip and the existence of a scrub angle in a vehicle having a steering axle and one or more pairs of tandem axles. The sideslip tester includes a measurement plate movable laterally with respect to the direction of travel of a vehicle under test. The measurement plate is moved laterally as a result of lateral forces acting upon the vehicle's tire as the vehicle passes over the measurement plate. A lateral movement sensor, operatively connected to the measurement plate, senses the amount of lateral movement of the measurement plate as the vehicle tire passes over the plate. The lateral movement sensor provides an output corresponding to the amount of lateral movement measured and sends it to a microprocessor which determines the magnitude of the sideslip from the output. Sensors, preferably spaced switches, are provided on opposite sides of the measurement plate. The spaced sensors indicate when a tire is approaching and leaving the measuring plate. The sensors are spaced apart a distance equal to the average distance between the centers of tandem axles. When both sensors are actuated simultaneously, the tester determines that a tandem axle pair of a multi-axle vehicle is passing over the measurement plate. When the tester determines that it has been presented with a tandem axle pair, the tester determines the scrub angle of the pair from the sideslip measurement for each axle of the tandem axle pair.

BRIEF DESCRIPTION OF THE DRAWINGS

FIG. 3 is a schematic view of the sideslip tester in its operating environment;

FIG. 4 is a perspective view of a runway of the sideslip tester, including a measurement plate, a spacing plate, and switch assemblies;

FIG. 8 is a cross-sectional view taken along line 8—8 of FIG. 7 showing one track arrangement of the measurement plate;

FIG. 9 is a cross-sectional view taken along line 9—9 of FIG. 7 showing another track arrangement of the measurement plate;

FIG. 10 is a cross-sectional view taken along line 10—10 of FIG. 7 showing one of the switch assemblies of the sideslip tester;

DESCRIPTION OF THE PREFERRED EMBODIMENT

Figure 1:
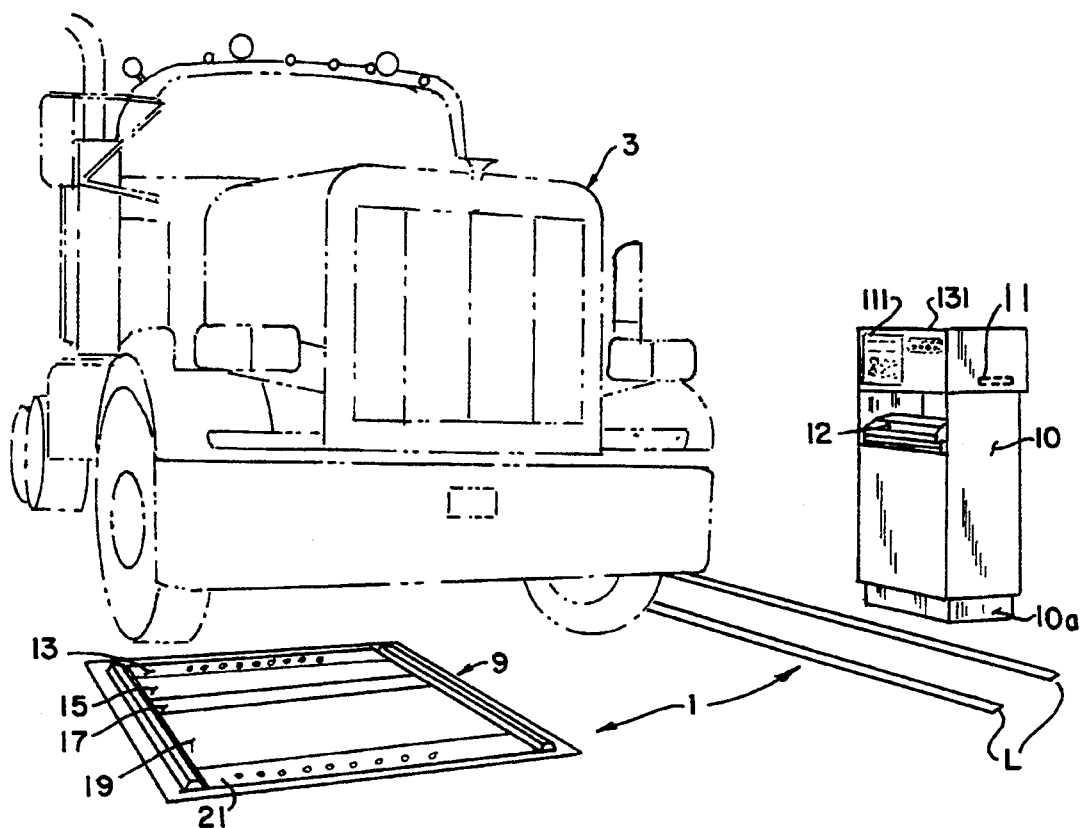
FIG. 1 is a perspective view of a truck tractor approaching a sideslip tester of the present invention.
Figure 2A:
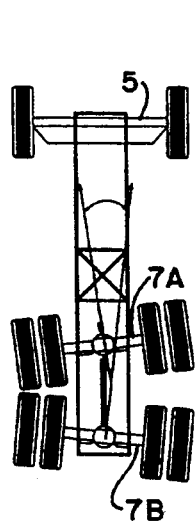
FIG. 2A is a schematic drawing of a multi-axle vehicle having a steering axle and tandem axles, the tandem axles having a scrub angle.
Figure 2B:
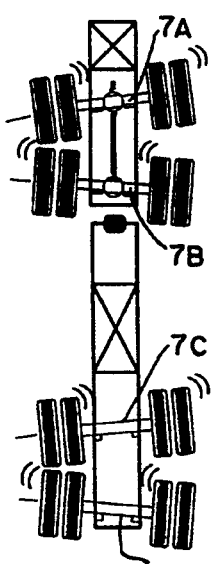
FIG. 2B is a schematic drawing of the tandem axles of a multi-axle vehicle which is pulling a trailer having tandem axles, the tandem axles of both the vehicle and the trailer having a scrub angle.
Figure 2C:
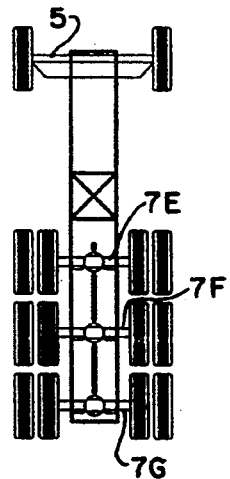
FIG. 2C is a schematic drawing of a multi-axle vehicle, such as a dump truck, having a steering axle and three rear axles creating two pairs of tandem axles, the tandem axles all being parallel.

Turning to the drawings, a sideslip tester or meter 1 of the present invention is used to detect and measure both the sideslip in a multi-axle vehicle 3 and the scrub angle of the vehicle's tandem axles. The axles of various vehicles 3 are diagrammatically shown if FIGS. 2A-C. The vehicle has a steering or front axle 5 and rear axles 7A and 7B. Axles 7A and 7B represent a pair of tandem axles. In proper operating condition, the tandem axles are parallel. The axles 7A and 7B, as seen in FIG. 2A, are shown not to be parallel, and therefore the tandem axles have a scrub angle. In FIG. 2B, the vehicle has tandem axles 7A and 7B, which again are not parallel, and is shown pulling a trailer having axles 7C and 7D. Axles 7C and 7D represent another pair of tandem axles which are not parallel, but in proper operating conditions would be parallel. The vehicle of FIG. 2C has three rear axles 7E, 7F, and 7G representing two pair of tandem axles. One pair is made of axles 7E and 7F and the second pair is made of axles 7F and 7G. The two pair of tandem axles of FIG. 2C are parallel. As will be explained below, sideslip tester 1 measures the sideslip for each axle independently and determines the scrub angle for each pair of tandem axles on the vehicle.

Sideslip tester 1 includes a runway 9 and a console 10 containing a microprocessor 11, a display 111, a control panel 131, and a printer 12. Console 10 may be pivoted about its base 10a so that display 111 may be easily seen from most any position. Runway 9 is mounted in a drive 44 (FIG. 3) to be flush with the surface over which the vehicle to be tested rolls. Runway 9 includes an approach switch plate 13, a spacer plate 15, a cover plate 17 which covers a measuring device, a measurement plate 19, and an exit switch plate 21. Spacer plate 15 serves only to space the approach and exit switch plates (and switches) apart by about 52". This is the approximate distance between the centers of the axles of a conventional tandem axle pair of a multi-axle vehicle, such as semi-trailers, dump trucks, etc.

Figure 5:
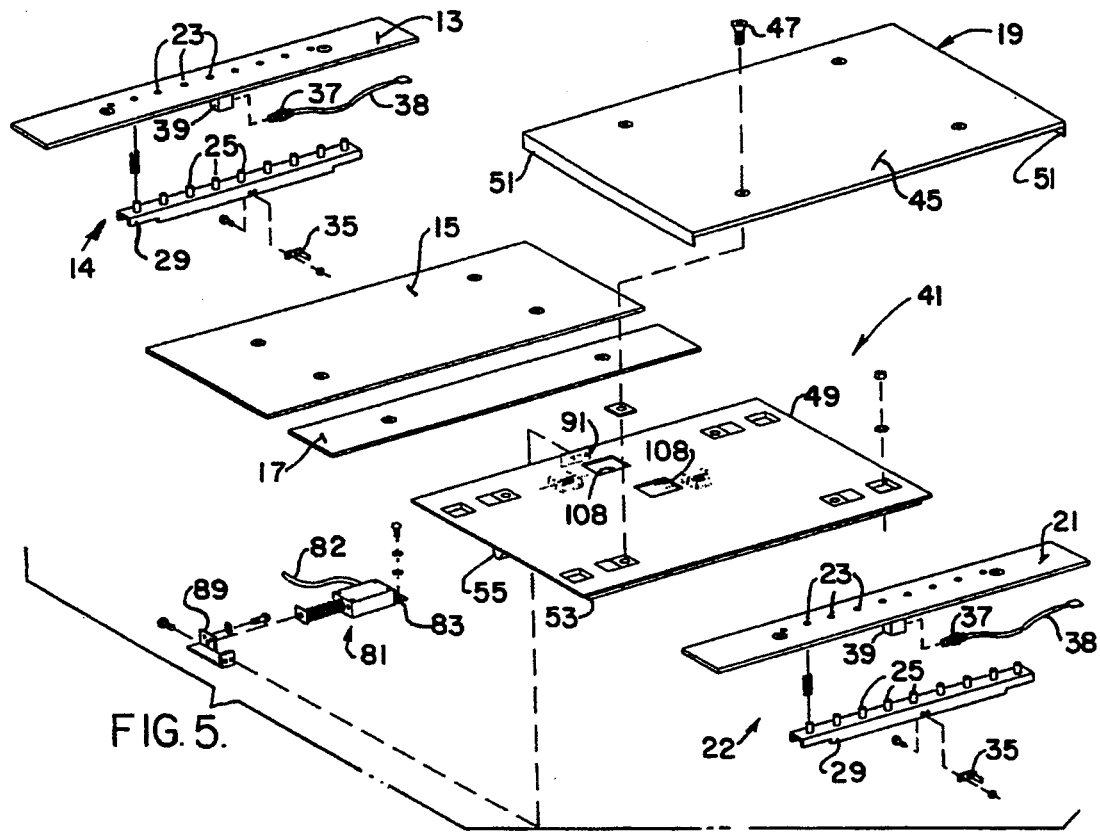
FIG. 5 is an exploded view of a top assembly of the runway of FIG. 4.

Turning to FIGS. 5 and 10, approach switch plate 13 and exit switch plate 21 are identical and cover an approach switch 14 and an exit switch 22, which are identical. Each plate has a plurality of holes 23 through which teeth 25 extend. Teeth 25 extend generally across the entire width of switch plates 13 and 21 to ensure that they will be depressed when driven over by a vehicle. Teeth 25 extend upwardly from a generally U-shaped bar 29 which is received in a generally U-shaped track 31. Bar 29 and track 31 define a channel 33 in which a coiled spring 35 is received to bias bar 29 normally upwardly so that teeth 25 extend up and out of plates 13 and 21.

A vane 35 is connected to a downwardly extending leg of bar 29 and extends outwardly therefrom. Vane 35 is positioned to be in front of a proximity sensor 37 which is fixed to a downwardly extending leg 39 of plates 13 and 23. Proximity sensors 37 are operatively connected to microprocessor 11 by a conduit 38 (FIG. 3). Conduit 38 is buried, as shown in FIG. 3, so that the vehicle 3 being tested will have a smooth, flat surface to drive over. When a vehicle passes over plates 13 and 21, teeth 25 are depressed, urging bar 29 and vane 35 downwardly. Vane 35 passes out of view of the proximity sensor 37 to activate the sensor. The sensor then sends a signal to microprocessor 11 that a switch has been depressed. If the approach switch 13 is actuated, the microprocessor is alerted, by sensor 37, that an axle is approaching, and when exit switch 22 is actuated, the microprocessor is alerted that that axle is done, and to prepare for the next axle. Spacer plate 15 is sized, in conjunction with measurement plate 19, to space teeth 25 of plates 13 and 21 fifty-two inches (52") apart. This is the standard distance from center to center of tandem axles on a vehicle having tandem axles. When the approach switch and the exit switch are actuated simultaneously, the sensors of each switch send a signal to the microprocessor at the same time and the microprocessor is informed that tandem axles are passing over the runway 9. When microprocessor 11 receives the signal that it is being presented with a tandem axle pair, it determines the scrub angle of the pair in a manner explained below.

The sideslip tester also keeps track of the number of axles for which sideslip is being measured, which axle is being tested, and which axle to expect next. Each time the approach switch is activated, sideslip tester is informed that a new axle is being measured, and each time the exit switch is activated, sideslip tester 1 is informed that that wheel has been measured and to expect another axle. Sideslip tester can only operate if the vehicle passes over runway 9 in the direction from the approach switch to the exit switch, i.e., in the direction of the arrow A in FIG. 3. If the exit switch 22 is actuated before the approach switch, the vehicle is being backed up over runway 9 and microprocessor 11 does not compute sideslip or scrub angles.

Figure 6:
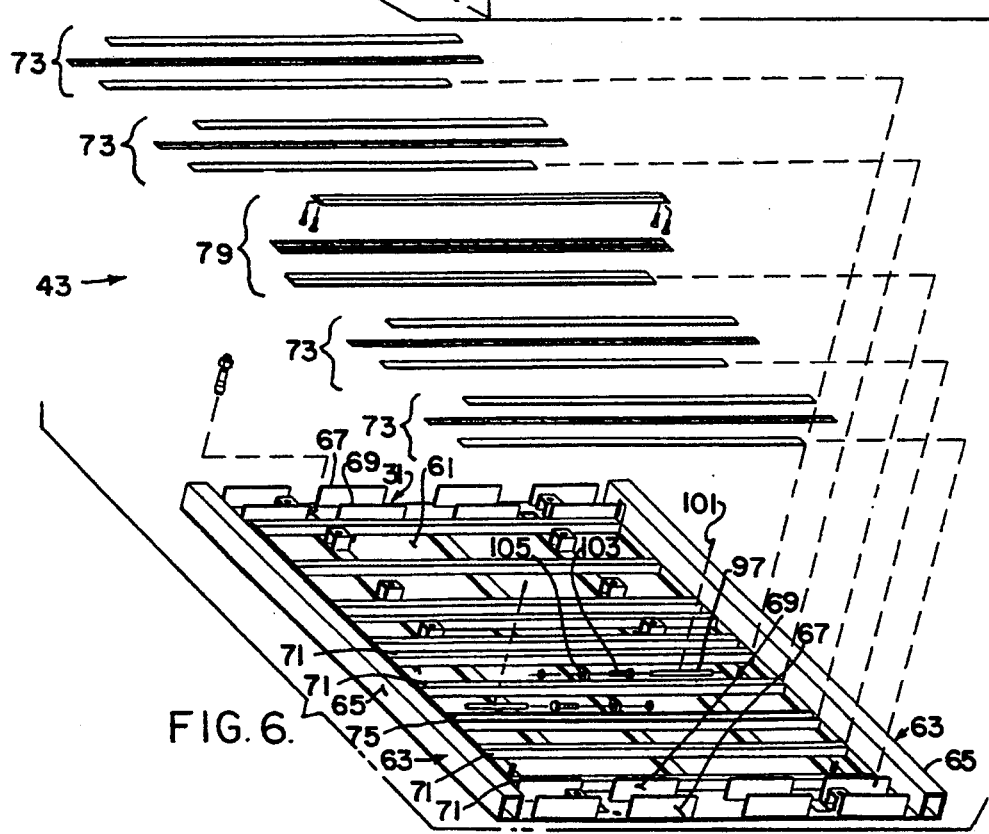
FIG. 6 is an exploded view of a sub-assembly of the measurement plate of FIG. 4.

Turning to FIGS. 5 and 6, measurement plate 19 includes a top assembly 41 and a sub-assembly 43. Top assembly 41 is slidably mounted on sub-assembly 43. Top assembly 41 includes a top plate 45 which is mounted, by screws 47 or the like, to a base or frame 49. Top plate 45 is the plate which is exposed and is driven over by the vehicle being tested. Top plate 45 has walls 51 extending downwardly from the side edges thereof. Base 49 has a plurality of inverted U-shaped tracks 53 evenly spaced from the front to the back of base 49 and an inverted, generally pyramidal bar 55 extending downwardly from the center of base 49. Both tracks 53 and bar 55 extend laterally substantially the full width of base 49.

Sub-assembly 43 is positioned along the drive 44 (FIG. 3) over which the vehicle to be tested is driven. The drive is provided with guide lines L to guide the operator so that the wheels of the vehicle are driven over runway 9. Sub-assembly 43 is positioned in a hole formed in drive 44 sized to receive sub-assembly 43 and prevent it from moving under the forces of the vehicle tested. To ensure that sub-assembly 43 does not move, it may be bolted or otherwise secured within the hole. The hole is sufficiently deep so that when top assembly 41 is positioned on sub-assembly 43, plates 15, 17, 19, and 21 will be flush with drive 44. This will prevent the vehicle from encountering any "bumps" which may affect the test, as it is being tested.

Sub-assembly 43 includes a base 61 (FIG. 6) which extends the full length of runway 9. Base 61 has upwardly extending side walls 63 defined by generally square tubes 65 and outer 67 and inner 69 spaced walls at its front and back. The inner and outer walls 69 and 67 define the U-shaped bar 31 which receives switch arms 29. A plurality of upwardly extending bars 71 extend laterally across base 61 and have bearing assemblies 73 secured to the top thereof. A bar 75 having a V-shaped groove 77 (FIG. 8) extends upwardly from the center of base 61 and extends laterally across base 61. V-groove 77 is lined with a bearing assembly 79. As seen in FIGS. 8 and 9, tracks 53 are received on bars 71, and bar 55 is received in groove 77. Tracks 53 slide on bearing assemblies 73 and bar 55 slides on bearing assembly 79, allowing top assembly 41 to move laterally with respect to sub-assembly 43. When a vehicle passes over runway 9, one tire passes over measuring plate 19 and the other tire stays on the pavement. The lateral forces exerted on the tires by the wheel on the pavement forces the top assembly 41 of measuring plate 19 to slide laterally inwardly or outwardly, depending on the toe condition. The distance the measuring plate is moved indicates the amount of sideslip that exists.

Figure 12:
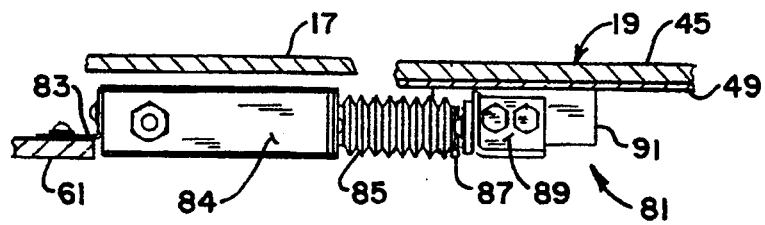
FIG. 12 is a cross-sectional view taken along line 12—12 of FIG. 7 showing the transducer of the sideslip tester which determines the magnitude of the sideslip of a vehicle being tested.

Turning to FIGS. 5 and 12, a linear transducer 81 measures the distance the measuring plate 19 is moved by the sideslip of the vehicle tested. Transducer 81 is preferably an optical encoder which converts rotational motion into linear motion such as the Type 601-128-C24 type transducer sold by Clarostat Manufacturing Company, Inc. of Dover, N.H. Transducer 81 is operatively connected to microprocessor 11 by conduit 82 and sends a signal to processor 11 when plate 19 is moved. Processor 11 converts this signal to a measurement of sideslip.

Transducer 81 includes a housing 84 which is secured to sub-assembly base 61 by a bracket 83. An expandible, collapsible bellows 85 extends from an end of housing 84 opposite bracket 83 and includes a lock wire 87 which secures bellows 85 to a bracket 89, which, in turn, is mounted to a flange 91 extending downwardly from a back edge of top assembly base 49.

Preferably, transducer 81 is located beneath cover plate 17. This allows access to the transducer without the need to dissassemble plate 19 should the transducer need servicing. However, by rearranging the bracketing for transducer 81, it could be positioned beneath top assembly frame 49, eliminating the need for cover plate 17. If cover plate 17 were eliminated, spacer plate 15 would have to be enlarged to properly space switches 14 and 22.

As the measuring plate 19 is moved by the lateral forces from the wheel on the pavement, transducer 81 measures the distance the plate is moved and sends a signal to the microprocessor 11 which converts the signal to a sideslip measurement. Microprocessor 11 stores the sideslip measurement for each axle that is tested. When sideslip tester 1 is presented with tandem axles, the values for the sideslip for each axle of the tandem axle pair are used to arrive at a scrub angle. The scrub angle is determined by subtracting the sideslip measurement of the first axle of the pair from the sideslip measurement of the second axle of the pair. If the result is negative, then the absolute value is taken, so that the scrub angle will be positive. For example, in FIG. 2A, if axle 7A has a sideslip measurement of +20 feet/mile and axle 7B has a sideslip measurement of −15 feet/mile, the tandem axles will have a scrub angle of 35 feet/mile.

Figure 7:
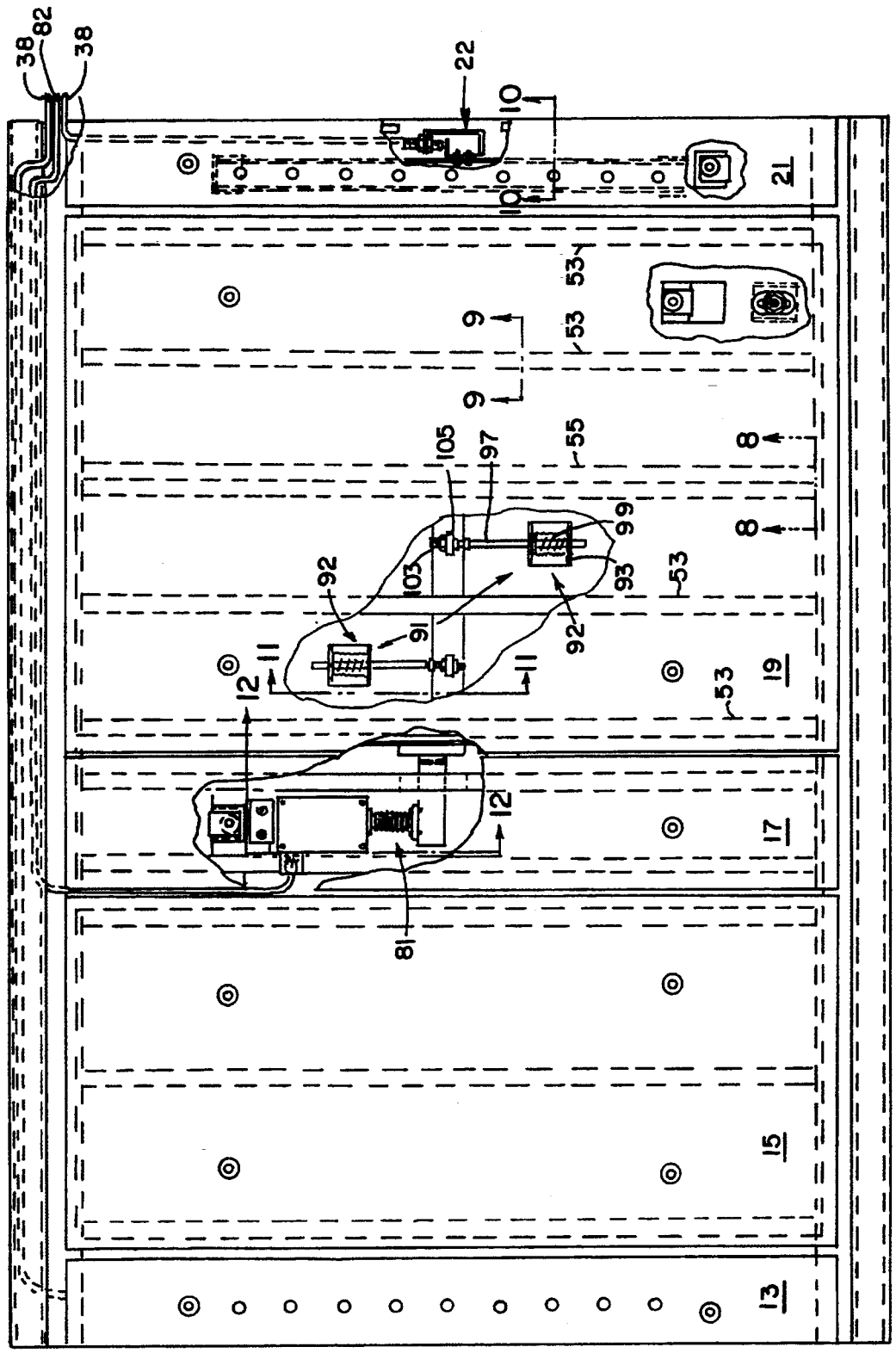
FIG. 7 is a plan view of the measurement plate of FIG. 4 broken away to show a transducer, a centering mechanism, and a switch assembly.
Figure 11:
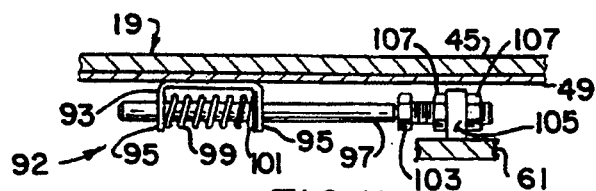
FIG. 11 is a cross-sectional view taken along line 11—11 of FIG. 7 showing the centering mechanism for the measurement plate.

After an axle is measured for sideslip, measurement plate 19 must be returned to center so that it will be ready to measure sideslip for the next axle to pass thereover. A centering mechanism 91 is shown in FIGS. 7 and 11. Centering mechanism 91 consists of two identical halves 92 which exert opposite forces. Each half 92 of centering mechanism 91 includes a U-shaped bracket 93 having downwardly extending legs 95. Bracket 93 is mounted to frame 49 to be parallel to the lateral axis of frame 49. A bar 97 extends laterally with respect to frame 49 and is slidably journaled through legs 95 and a coiled spring 99 is journaled about rod 97. Spring 99 is sandwiched between legs 95. A pin 101 extends through bar 97 at a point between legs 95. When spring 99 is in its relaxed state, pin 101 is biased against an inner leg of bracket 93. Bar 99 has a forward end which abuts an adjustment screw 103. Adjustment screw is screwed into a flange having walls 105 extending up from lower frame 61 and is secured in position by a pair of nuts 107 positioned on opposite sides of walls 105. When measurement plate 19 is moved by the sideslip of a vehicle, bracket 93 is moved toward lower frame wall 105, compressing spring 99 between pin 101 and the bracket leg 95 spaced from pin 101. When the tire rolls off of measuring plate 19, plate 19 is released from the lateral forces of the vehicle's sideslip, and the compressed spring biases the plate back to its center position. The centering mechanism 91 consists of two such assemblies, urging the plate in opposite directions. Thus, the plate can be returned back to center independently of the direction it is moved by the vehicle's sideslip. Further, the opposing forces of the two halves of the centering mechanism return the measuring plate to the same position each time and prevent the measuring plate from being moved to an off-center position. The centering mechanism 91 is preferably adjusted so that there is substantially no lateral forces applied to the measuring plate by the springs when at rest in the central position. Openings 108 (FIG. 5) are provided in top assembly frame 49 above walls 105 and nuts 107. Openings 108 provide access to the adjusting screws 103 so that their position can be adjusted relative to springs 99 so that the springs exert no lateral forces on the plate when it is in its center, at rest, position.

Figure 13:
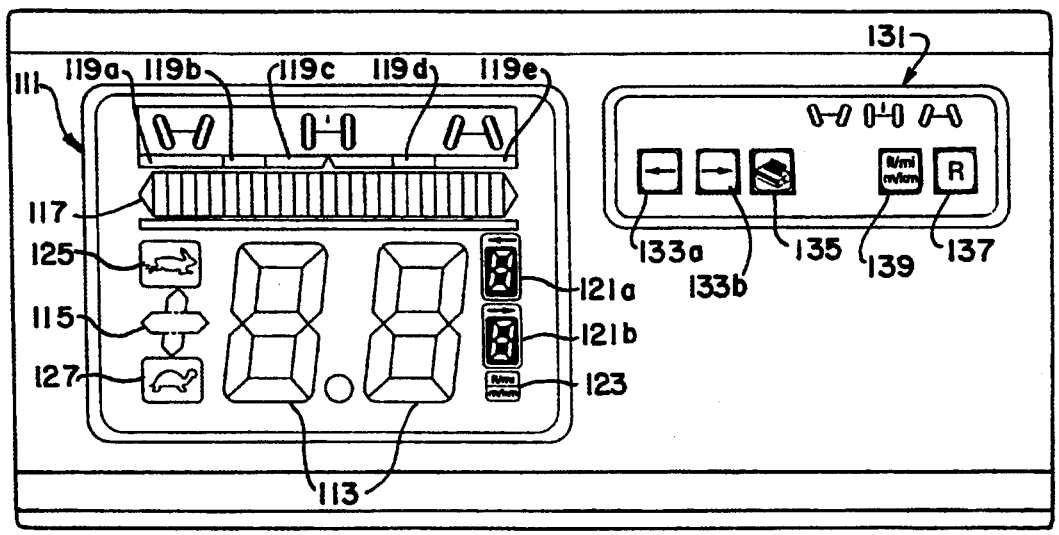
FIG. 13 is a plan view of the display and control panel of a computer of the sideslip tester.

A display 111 of the sideslip tester, shown in FIG. 13, is located on console 10. The display includes large numbers 113 and a sign indicator 115 which display the magnitude and direction of the sideslip measured. A multi-color bar 117 and five status indicators 119a–e give a graphic display of the amount and direction of the sideslip measured. A first axle indicator 121a shows which axle is presently being tested, and a second axle indicator 121b shows which axle the sideslip tester expects to measure next. The unit indicator 123 indicates the units (feet/mile or meters/kilometer) in which the sideslip is being measured.

The determination of sideslip must be made within a certain range of speeds. If the vehicle moves too fast or too slow, the sideslip tester will not compute sideslip or scrub because the result would be unreliable. The sideslip tester 1 determines the speed at which the vehicle is passing over the runway 9 based on the time between actuation of the entrance and exit switches. If the vehicle is moving too fast or too slow, an indicator 125 or 127, shown in the form of a hare and a turtle, respectively, is energized to inform the operator that the test was performed at a wrong speed and must be performed again. The elements of display 111 are sufficiently large to be seen from a distance. The easy visibility of display 111 is enhanced by the fact that console 10 may be pivoted. The operator may therefore easily see the display, and can determine, for example, if the test was performed at an improper speed without exiting the vehicle being tested.

A control keypad 131 is located adjacent the display 111 on console 10. Keypad 131 includes scrolling buttons 133a–b which allows an operator to view the results for each axle on the display panel after the test is performed. When the display is scrolled, the magnitude is displayed by elements 113 and 115, and the wheel whose measurement is displayed is shown by element 121a. A print button 135 directs the sideslip tester to print the results on printer 12, which is also disposed on console 10. A reset button 137 resets the sideslip tester to ready tester 1 for a new vehicle. Printing of the results by pressing the print button 135 also resets the unit. Moreover, the unit has a timeout function. If no wheel is tested within a predetermined time period, for example twenty seconds, the unit automatically prints the results from the test and resets. Lastly, a unit selector button 139 allows the operator to choose the units in which the results are displayed.

In view of the above, it will be seen that the various objects and features of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense. Merely by way of illustration, the spacer plate could be excluded from the runway portion of tester 1. This would of course require forming at least two holes in drive 44 to properly space the switches. Also, the tester could be provided with two measurement plates, rather than having only one as disclosed. Each measurement plate would then be provided with a lateral movement sensor and a centering mechanism. These examples are merely illustrative.

We claim:

1. A sideslip tester for detecting sideslip in a vehicle having a steering axle and at least one pair of tandem axles separate from said steering axle, said sideslip tester comprising:

at least one measurement plate, movable laterally with respect to the direction of travel of a vehicle under test, as a tire of said vehicle passes over said measurement plate, said at least one measurement plate being moved laterally from a center position as a result of lateral forces acting upon said tire;

at least one lateral movement sensor operatively connected to said measurement plate to sense the amount of lateral movement of the measurement plate as said vehicle tire passes over said plate, said lateral movement sensor providing an output corresponding to the amount of lateral movement measured;

means for determining when at least one pair of tandem axles is passed over said measuring plate; and means for determining a scrub angle of at least one pair of tandem axles.

2. The sideslip tester of claim 1 wherein said tandem axle determining means includes a first switch on a first side of said measuring plate, a second switch on a second side of said measuring plate, and a control unit operatively connected to said first and second switches and responsive to the actuation thereof for detecting the passage of the at least one tandem axle pair over the measuring plate.

3. The sideslip tester of claim 2 wherein said first and second switches are spaced apart a distance approximately equal to the distance between the centers of said tires of said tandem axle pair.

4. The sideslip tester of claim 2 wherein said control means is operatively connected to said lateral movement sensor, said control unit including means responsive to the output of said lateral movement sensor for each axle of said tandem axle pair to determine said scrub angle.

5. The sideslip tester of claim 1 further including a display means operatively connected to said control means for displaying said scrub angle.

6. The sideslip tester of claim 5 wherein said display means is mounted on a console.

7. The sideslip test of claim 6 wherein said console is pivotable about a vertical axis.

8. The sideslip tester of claim 1 further including means for centering said measurement plate after a wheel has passed thereover and moved said measurement plate laterally from its center position 9. The sideslip tester of claim 8 wherein said centering means exerts no lateral forces on said measurement plate when said measurement plate is in its said center position.

10. The sideslip tester of claim 9 wherein said centering means includes two spring biased assemblies which exert lateral forces on said measuring plate to center said measuring plate after it has been moved laterally.

11. The sideslip tester of claim 10 wherein each said assembly includes a bracket having legs and being fixed to a movable part of said measurement plate, a rod slidably journaled in said bracket legs and fixed against lateral motion, and a spring contained between said bracket legs, such that when said plate is moved laterally said spring is compressed by one of said legs, and when said measuring plate is released, said spring acts against said one leg to urge said measuring plate to its center position.

12. The sideslip tester of claim 11 including means for adjusting said centering mechanism including an adjusting screw secured to a non-movable part of said measuring plate and a pin which extends through said rod adjacent a laterally outer end of said spring.

13. The sideslip tester of claim 1 including a runway, said runway including said measurement plate and approach and exit switches on either side of said measurement plate.

14. The sideslip tester of claim 13 said runway further including a spacer plate to space said switches apart a desired distance.

15. A sideslip tester for detecting sideslip in a vehicle having a steering axle and at least one pair of tandem axles, said sideslip tester comprising:

at least one measurement plate, movable laterally with respect to the direction of travel of a vehicle under test, as a tire of said vehicle passes over said measurement plate, said at least one measurement plate being moved laterally as a result of lateral forces acting upon said tire;

at least one lateral movement sensor operatively connected to said measurement plate to sense the amount of lateral movement of the measurement plate as said vehicle tire passes over said plate, said lateral movement sensor providing an output corresponding to the amount of lateral movement measured:

means for determining a scrub angle of any pair of tandem axles.

a first switch on a first side of said measuring plate, a second switch on a second side of said measuring plate, and a control unit operatively connected to said first and second switches and responsive to the actuation thereof for detecting the passage of a tandem axle pair over the measuring plate;

said control means being operatively connected to said lateral movement sensor, said control means including means responsive to the output of said lateral movement sensor for each axle of said tandem axle pair to determine said scrub angle and means for determining the difference between the sideslip measurement for each axle of said tandem axle pair to determine said scrub angle.

16. A sideslip tester for determining the sideslip of a vehicle having a steering axle and at least one pair of tandem axles separate from said steering axle, said sideslip tester comprising:

at least one measurement plate movable laterally with respect to the direction of travel of a vehicle under test as a tire of said vehicle passes over said measurement plate, said measurement plate being moved laterally as a result of lateral forces acting upon said tire;

at least one lateral movement sensor operatively connected to said measurement plate to sense the amount of lateral movement of the measurement plate as said vehicle tire passes over said plate, said lateral movement sensor providing an output corresponding to the amount of lateral movement measured;

means for determining when tires of said at least one pair of tandem axles are passing over said measurement plate.

17. The sideslip tester of claim 16 wherein said determining means includes a first switch positioned on one side of said measuring plate, a second switch positioned on a second side of said measuring plate, and a control device; said switches being operatively connected to said control device and said control device being responsive to the actuation of said switches to determine the passage of a tandem axle pair over said measuring plate.

18. The sideslip test of claim 16 including means for determining if the vehicle passed over the tester too quickly.

19. A sideslip tester for determining the sideslip of a vehicle having a steering axle and at least one pair of tandem axles, said sideslip tester comprising:

at least one measurement plate movable laterally with respect to the direction of travel of a vehicle under test as a tire of said vehicle passes over said measurement plate, said measurement plate being moved laterally as a result of lateral forces acting upon said tire;

at least one lateral movement sensor operatively connected to said measurement plate to sense the amount of lateral movement of the measurement plate as said vehicle tire passes over said plate, said lateral movement sensor providing an output corresponding to the amount of lateral movement measured;

means for determining when tires of tandem axles are passing over said measurement plate; said determining means including a first switch positioned on one side of said measuring plate, a second switch positioned on a second side of said measuring plate, and a control device; said switches being operatively connected to said control device and said control device being responsive to the actuation of said switches to determine the passage of a tandem axle pair over said measuring plate; said switches being spaced apart a distance equal to the distance between tandem axles of a multi-axle vehicle, said switches being actuated nearly simultaneously when a tandem axle pair rolls over said measurement plate.

20. The sideslip tester of claim 19 wherein said first and second switches include first and second mechanical switch actuators respectively, each switch actuator being movable by the passage of a vehicle thereover so as to actuate the corresponding switch.

21. The sideslip tester of claim 20 wherein said first and second switch actuators extend above the top surface of said measurement plate and are depressed by the passage of a tire thereacross.

22. The sideslip tester of claim 21 wherein the switches each include biasing means for biasing the switch actuator to an underpressed position.

23. The sideslip tester of claim 20 wherein each switch actuator extends generally across the entire width of said measurement plate.

24. The sideslip tester of claim 20 wherein each switch actuator carries a vane which moves generally vertically when the actuator is moved by the passage of a tire, each switch including a proximity sensor for sensing the location of its associated vane.

25. The sideslip tester of claim 24 wherein the proximity sensor is disposed such that the movement of the corresponding switch actuator by a tire moves the corresponding vane away from the proximity sensor.

26. The sideslip tester of claim 25 wherein the proximity sensor is operatively connected to said control means, said proximity sensor sending an output signal to said control means when said actuator is moved.

* * * * *